Patented June 30, 1925.

1,544,493

UNITED STATES PATENT OFFICE.

HENRI PAUL SOULIÉ-COTTINEAU, OF VILLEFRANCHE, FRANCE, ASSIGNOR TO LE CUIVRE NATIF, OF PARIS, FRANCE, A FRENCH COMPANY.

PROCESS FOR THE RECUPERATION OF METALS FROM WASTE PRODUCTS.

No Drawing.     Application filed March 28, 1925. Serial No. 19,143.

*To all whom it may concern:*

Be it known that I, HENRI PAUL SOULIÉ-COTTINEAU, citizen of the Republic of France, residing at 5 Rue de Tarare, Villefranche, Rhone, France, have invented new and useful Improvements in Processes for the Recuperation of Metals from Waste Products, of which the following is a specification.

The present invention relates to a process for the recuperation of metals which, under the form of silicates, are contained in certain waste products.

This process, which is effected without the application of heat and which is a wet process, is applicable to metallic slags which are of poor quality and complex composition, to waste products and sweepings of workshops, and to the residue obtained after washing ores which would not be worth the expense of treatment by the dry method, or which cannot be treated by the latter method, the aim of this process being to recover the metals contained in the slag and waste products treated.

In the small metallurgical industries there exists a greater number of waste products which are present in different forms and which can be divided into three categories:

1. Foundry slag (copper, bronze, various alloys, etc.) always contains a certain proportion of metal which, in practice, is not recoverable, since it is in the form of a silicate, and since the reduction of this latter by heat, would only give a result of little value below a certain content, which latter moreover, varies, according to the industry in which it is produced. The poorest slags, which correspond to the metals which are worked in the most efficient manner, contain up to 1.5% of copper and 10% of zinc. Many others exist which are three or four times richer in copper, the treatment of which is not attempted.

2. The sweepings of workshops, the residue proceeding from the mechanical concentration of waste products and foundry sand, which are not suitable for treatment by the dry process, owing to the low proportion of metals contained in such materials; sands containing from 3% to 5% of copper are thrown upon the scrap-heap and are considered as not being worth the trouble of handling them.

3. The slimes of a complicated composition which are residues from jigging tables are sometimes thrown away in mining operations owing to the difficulties of extracting copper where the ores do not contain other materials, such as sulphur in particular, which make them suitable for treatment by a sulphating roasting process.

These three points having been explained, one is presented materials containing various metals, in particular copper and zinc, with a content of the first metal which varies from 1% to 5% and a content of the second metal, which varies from 3% to 10%. These two metals can be dissolved when, contained in an ore which only contains them to the above extent, sulphating thereof is easy, as in the case of pyrites and blende. This dissolution has not been carried out in the case of the two first categories, in view of the difficulty in attacking the silicates and the difficulty of oxydizing the dust. As regards the third category, it has not been effected for the reason already given.

If, therefore, this dissolution can be effected at a low cost by a simple process without the application of heat and starting from natural products, the recuperation of large quantities of copper and of zinc becomes possible.

The present invention relates to a process of this kind which is applicable to the three cases set forth.

The present invention consists essentially in treating a suitably proportioned pulverized mixture of materials (the proportion to be determined according to the case in hand) with a small proportion of fluor-spar (natural ore) in the presence of diluted sulphuric acid so as to cause a reaction, which decomposes the silicated slag and oxidizes the metals liberated and dissolves them in the excess of acid.

The metals can then be recuperated from the solution by any known method.

The effervescence of the reaction causes an oxidizing vaporization which acts upon the metallic portions of the mixture. By means of this process it is possible to obtain solutions of copper and zinc starting from poor slag and dust without the use of fuel. In certain cases, and especially when it is desired to recover copper, a very small quantity of nitrate of soda can be added, so as to produce traces of nitric acid which facilitate the dissolution of the copper in those cases where certain portions of this metal in the mixture might be of rather too large dimensions. It should be noted that fluor-spar which, up to the present, has been used in laboratories, for etching on glass, and as a flux in metallurgy in the dry way, has never been used for the dissolution of metallic waste without the addition of heat, and in particular has not been used for the disaggregation of slag. The oxidizing action, which is produced at the moment of reaction, has never been pointed out and this action is indispensable in order to obtain the dissolution of the copper, even after its disaggregation from the silicates.

A small quantity of fluor-spar is sufficient to treat a large quantity of slag, since the hydrofluoric acid produced, on attacking the silica, is converted into fluoride of silicon, which, when in presence of water, regenerates the fluorine element in the form of an active acid, and so on.

An example of this is the manufacture of super-phosphates, in the course of which the natural ores all contain a very small proportion of fluorine. After the mixing operation, an enormous quantity of silica is found in the ventilating pipes, although the fluorine element remains in the acid state, either fluorhydric or fluosilicic and pierces the stoneware pipes. Once the metals are dissolved (the two principal metals aimed at being copper and zinc), they can easily be recuperated in the order, copper, zinc, the first by cementation, for example, and the second by the electrolytic method. As regards the recuperation of the copper, the process forming the subject of Patent No. 1,431,130 of October 3, 1922 granted to Mr. Soulié-Cottineau can be utilized with advantage.

An example of carrying out the process, according to the present invention is given below:

Let it be assumed that 40 tons of vitrified slag containing 0.90 to 1.20% of copper and 10% of zinc in the form of silicates are to be treated daily. In addition, there is also a small quantity of sweepings of complex composition, copper, zinc, iron, nickel. After the slag has been broken up and passed through the pulverizer, after screening there is obtained a powdered slag which is transported by an endless screw to a continuous mixer in which are placed together 200 kilogrammes of slag, 40 kilogrammes of fluor-spar, also pulverized, and a proportion of 5% of sweepings. In this latter case 2 kilogrammes of nitrate of soda may be added. The whole is mixed with sulphuric acid diluted to about 26° Baumé, the quantity thereof corresponding to 100 kilogrammes of monohydrate ($H_2SO_4$).

The product, after mixing, is precipitated into a water-tight vat or passed into a filter-press. The liquid, after having deposited the copper contained therein upon iron or zinc, is led to the apparatus for recovering the zinc, and the solid residue, which is in the form of a sand suitable for the market and consisting solely of white silica, is evacuated in any suitable manner.

The reaction is instantaneous. It is, moreover, for this reason, that a continuous mixer is utilized, that is to say, one without an emptying device which would require a workman to operate it after a certain time.

Under these circumstances, the period required to dissolve 40 tons of slag is about five hours, all operations included.

I claim:

1. A process for the recuperation of metals contained in waste-products in the form of silicates, consisting in subjecting said waste-product in a pulverized form, together with a small proportion of fluor-spar, to the action of an acid for the purpose of disaggregating the silicates, oxidizing the metals liberated and dissolving them in the excess acid.

2. A process for the recuperation of metals contained in waste-products in the form of silicates, consisting in subjecting said waste-product, together with a small proportion of fluor-spar, in a pulverized condition to the action of sulphuric acid for the purpose of disaggregating the silicates, oxidizing the metals liberated and dissolving them in the excess acid.

3. A process for the recuperation of metals contained in waste-products in the form of silicates consisting in subjecting said waste-product, together with a small proportion of fluor-spar, in a pulverized condition to the action of dilute sulphuric acid for the purpose of disaggregating the silicates, oxidizing the metals liberated and dissolving them in the excess acid.

4. A process for the recuperation of metals contained in waste-products in the form of silicates, consisting in subjecting said waste-products, together with a small proportion of fluor-spar, to the action of sulphuric acid for the purpose of disintegrating the silicates, oxidizing the metals liberated, dissolving them in the excess acid and recovering them from the solution.

5. A process for the recuperation of metals contained in waste-products in the form of silicates, consisting in subjecting said waste-products, together with a small proportion of fluor-spar, to the action of sulphuric acid diluted with water for the purpose of disintegrating the silicates, oxidizing the metals liberated, dissolving them in the excess acid and recovering them from the solution.

6. A process for the recuperation of metals from waste-products in the form of silicates, consisting in subjecting said waste-product together with a small proportion of fluor-spar, pulverized and mixed together to the action of sulphuric acid, and adding nitrate of soda to said mixture in order to obtain traces of nitric acid for the purpose of facilitating the dissolution of the copper.

7. A process for the recuperation of metals from waste-products, consisting in mixing the following materials in substantially the following proportions: 200 kilograms of pulverized slag; 40 kilograms of pulverized fluor-spar, 2 kilograms of nitrate of soda, and a quantity of sulphuric acid at 26° Baumé equivalent to 100 kilograms of monohydrate ($H_2SO_4$) and recovering the metals from the resulting solution.

HENRI PAUL SOULIÉ-COTTINEAU.